Patented Oct. 30, 1945

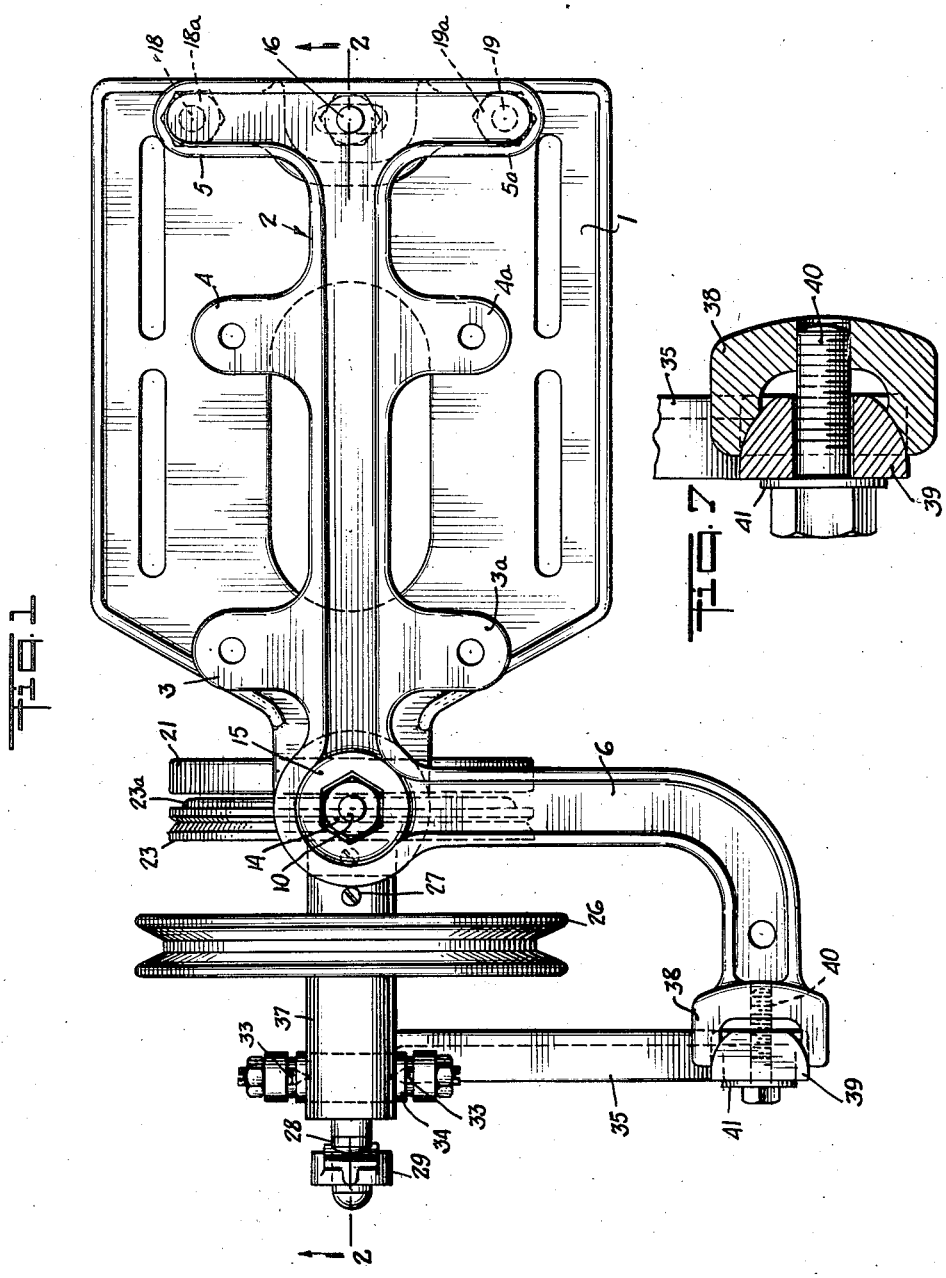

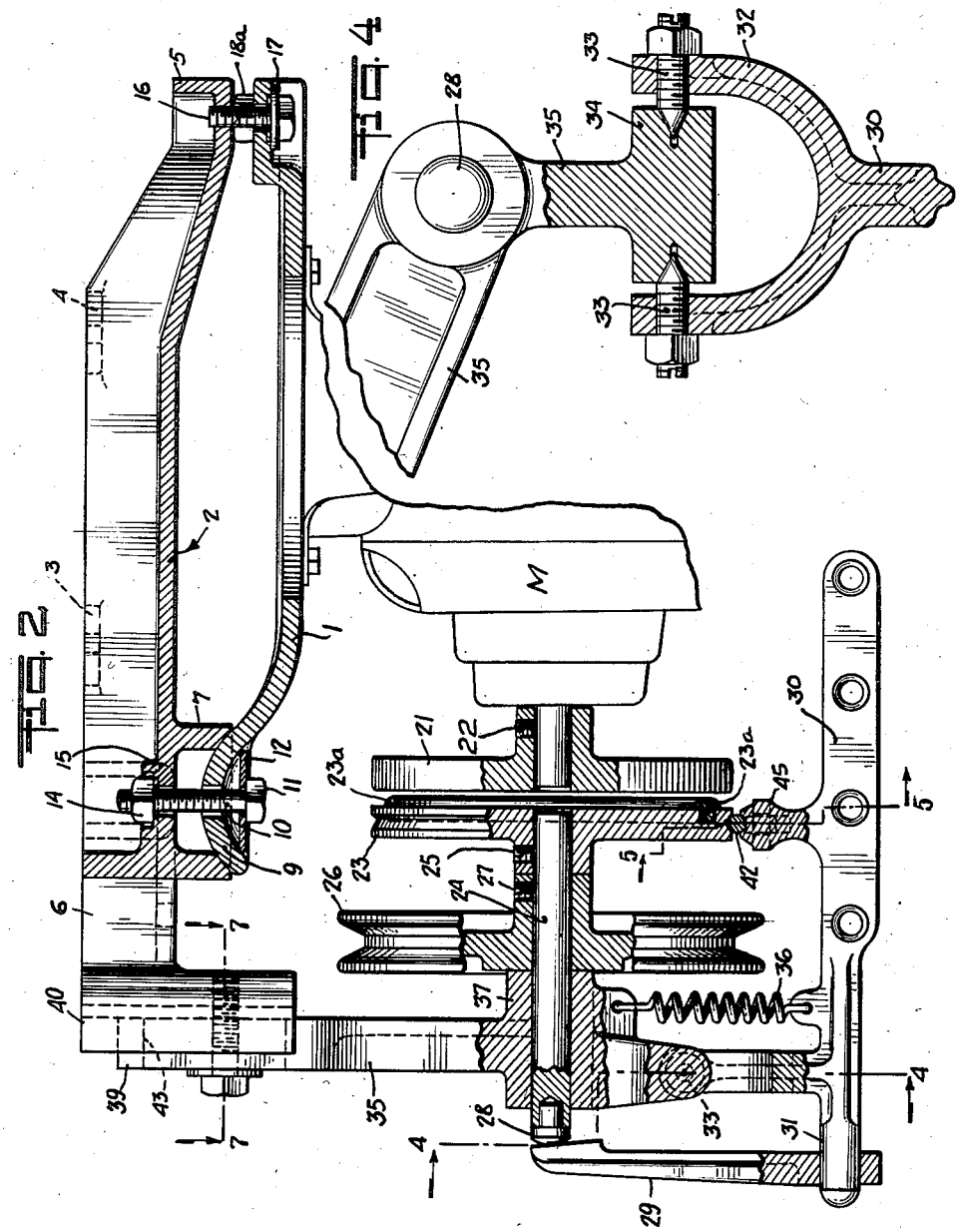

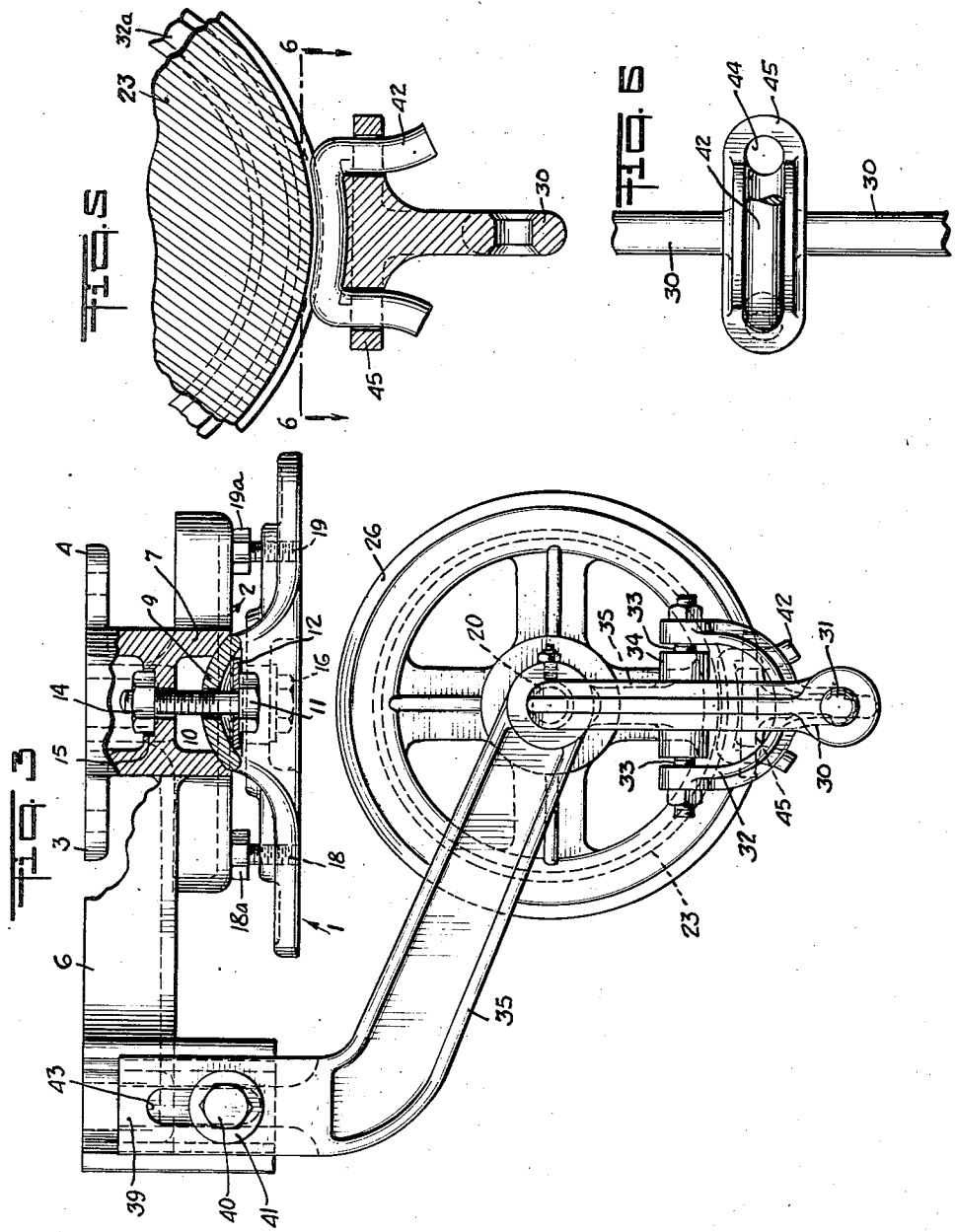

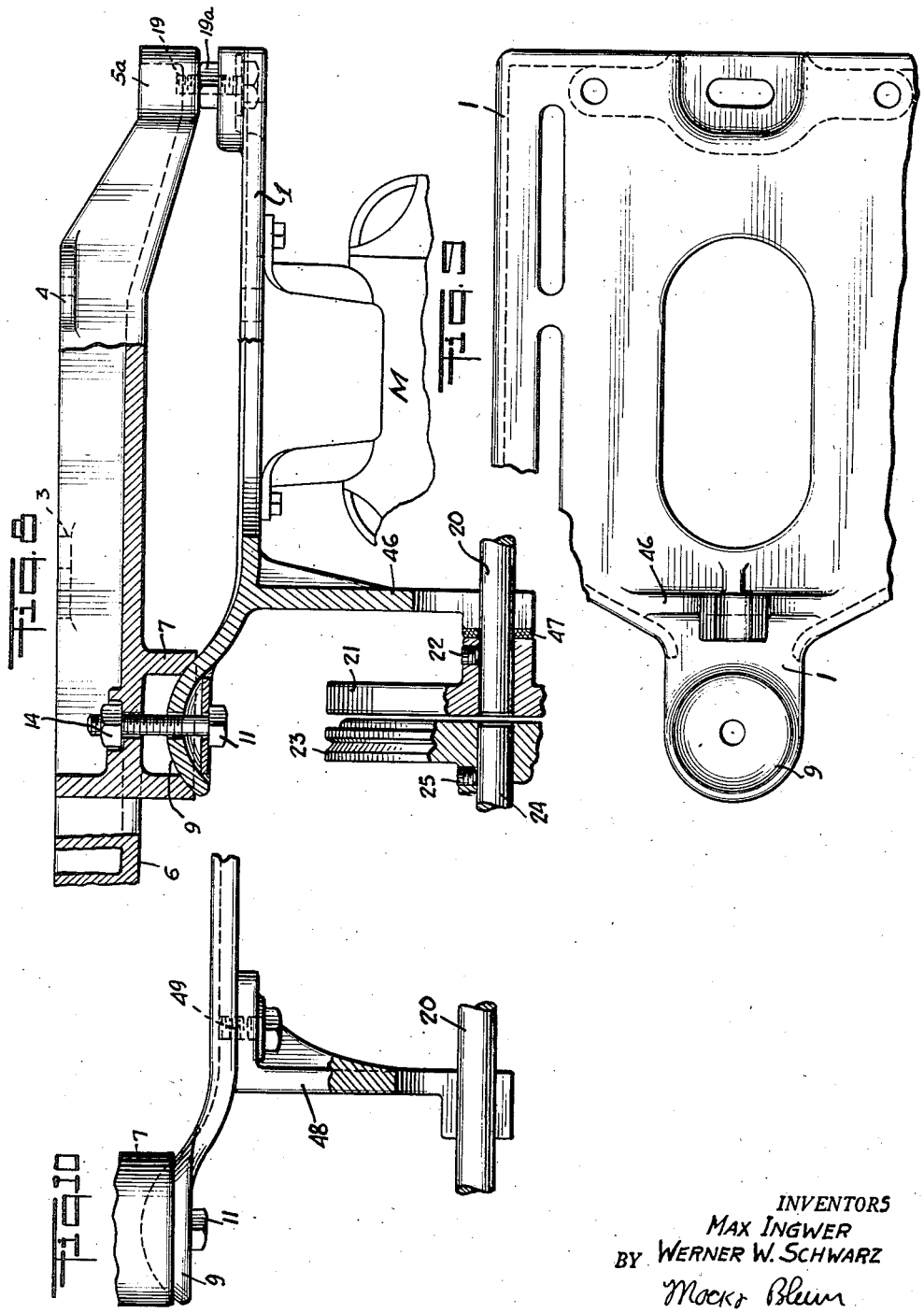

2,387,910

UNITED STATES PATENT OFFICE 2,387,910

POWER TRANSMISSION DEVICE

Max Ingwer and Werner W. Schwarz, New York, N. Y., assignors to Consolidated Sewing Machine & Supply Co. Inc., New York, N. Y., a corporation of New York Application July 9, 1943, Serial No. 493,976

3 Claims. (Cl. 192—66)

Our invention relates to a new and improved power transmission device.

One of the objects of our invention is to provide a simple and rugged device of the friction clutch type, for transmitting power, as for example, from an electric motor to a sewing machine or other machine.

Another object of the invention is to make it possible for the mechanic who installs the clutch apparatus, to line up the shaft of the motor speedily and accurately with the driven shaft of the friction clutch. For example, this can be done by a simple and suitable adjustable connection between the platform on which the motor is mounted, and a supporting frame. This makes it unnecessary to shim the electric motor, in order to obtain the required proper alignment of the driving shaft of the motor and the driven shaft of the transmission.

Another object of our invention is to make it possible easily and quickly to interchange belt pulleys of different diameters, in order to regulate the speed of the driven machine.

Another object of our invention is to make it possible to use standard belt pulleys.

Another object of our invention is to make it possible to interchange belt pulleys of different sizes, without disturbing the alignment of the motor shaft and of the driven shaft, after said shafts have been aligned in proper relation.

Another object of our invention is to provide a thrust arm which is either integral with the motor-supporting platform or which is adjustably connected to said motor-supporting platform, in order to take up the end thrust which is exerted upon the motor shaft, when the clutch disks or other friction members are forced into contact with each other. Said end thrust device is especially useful, if we use electric motors which are resiliently mounted, as for example, cradle-mounted electric motors. Such thrust bracket prevents the driving shaft of an electric motor which is thus mounted, from getting out of alignment with the driven shaft when the clutch disks are forced into contact with each other.

Another object of our invention is to provide a frame for supporting the platform of the motor which can be located in more narrow spaces than the known frames, and also to provide a specially designed L-shaped arm which extends from one end of said frame, and which, together with a specially designed clutch carrier, provides a transmission which will clear obstructing parts, such as drip pans and the like, and also fully clears the driving belt between the clutch and the driven machine. We can thus operate said driving belt at any desired angle.

Another object of our invention is to design the transmission and its various parts so as to require a minimum of machining operations, thus making it possible to use unmachined castings, thus reducing the cost of manufacture.

Numerous additional objects of our invention will be stated in the annexed description and drawings which illustrate preferred embodiments thereof.

Fig. 1 is a top plan view of the improved transmission;

Fig. 2 is a sectional view on the line 2—2 of Fig. 1;

Fig. 3 is a front elevation, taken at the left-hand side of Fig. 1;

Fig. 4 is a section on the line 4—4 of Fig. 2;

Fig. 5 is a section on the line 5—5 of Fig. 2;

Fig. 6 is a section on the line 6—6 of Fig. 5;

Fig. 7 is a section on the line 7—7 of Fig. 2;

Fig. 8 is a sectional view of a modification, in which the motor-supporting platform is provided with a thrust arm for maintaining the driving and driven shafts of the friction drive in alignment;

Fig. 9 is a bottom plan view of the motor supporting platform which is shown in Fig. 8; and Fig. 10 illustrates a modification of Fig. 8, in which the thrust arm is rigidly and detachably connected to the motor-supporting platform, instead of being integral with the motor platform.

The electric motor (not shown) is connected to and it depends from a motor-supporting platform 1. Said motor-supporting platform 1 is adjustably fixed to and it depends from a main frame 2. Said main frame 2 may be rigidly fixed to the underside of the table of the sewing machine or other driven machine. The table of the driven machine is not shown in the drawings.

As shown in Fig. 1, the main frame 2 has a narrow median longitudinal web, which is provided with equal lateral extensions 3, 3a, 4, 4a, 5 and 5a. At one end thereof the frame 2 is provided with an integral arm 6, which is L-shaped in top plan view. The main frame 2, including its integral arm 6, can be a single casting.

As shown in Fig. 2, the frame 2 is provided with a recessed head 7, whose concave bottom annular end wall has the shape of a part of a sphere. The motor-supporting platform 1 has a convex head 9 which fits against said end-wall of head 7. Fig. 2 and Fig. 5 show the partial outlines of a motor M, which is fixed to said motor-supporting platform 1. Hence, the head 9 can be turned in all directions relative to head 7, like a ball and socket joint. Said convex head 9 is adjustably fixed to the frame 2 by means of the head 7 and a bolt 10 which has a head 11, which clamps against a rigid washer 12. The bolt 10 passes with suitable clearance through a bore of the convex head 9 and through an aligned bore of the main frame 2. The clamping nut 14 is located in a cup-shaped projection 15 of the main frame 2. The non-circular inner wall of said cup-shaped projection 15 fits snugly against the non-circular outer wall of the nut 14. Hence, in order to clamp the head 9 in position, it is merely necessary to turn the bolt 10 by means of its head 11, because the nut 14 is held against turning.

The other end of the motor-supporting platform 1 is clamped to the frame 2, by means of a clamping screw 16, which passes through a tapped bore of the frame 2, which is located centrally in the extension 5, 5a. The usual clamping washer 17 is provided, so that the head of the screw 16 connects the respective end of the motor-supporting platform 1 firmly to the main frame 2. In order to provide for the proper adjusted relation between the motor-supporting platform 1 and the main frame 2, we also provide the platform 1 with supplemental abutment members or screws 18 and 19, whose shanks extend adjustably through respective tapped bores of the motor-supporting platform 1. The heads 18a and 19a of said screws 18 and 19 abut the underside of the extension 5, 5a. As previously stated, the head 9 and the recessed head 7, provide, in effect, a universal ball and socket connection, so that the motor-supporting platform 1 can be freely adjusted in any desired direction, relative to the main frame 2, before finally clamping the motor-supporting platform 1 to the main frame 2. By turning the screws 18 and 19 and thus adjusting the positions of their heads 18a and 19a relative to extensions 5 and 5a, the relation between the motor-supporting platform 1 at the right-hand end thereof which is shown in Fig. 2, and the undersides of the extension 5, 5a, can be regulated. That is, the screws 18 and 19 are first adjusted so that when their heads 18a and 19a abut the undersides of the extensions 5, 5a, the motor-supporting platform 1 is in proper adjusted relation relative to the frame 2. Of course, while this is done, the bolt 10 and the screw 16 are loose. After the desired adjustment of screws 18 and 19 has been secured, the bolt 10 and the screw 16 are then tightened so as to clamp the motor-supporting platform 1 in its final adjusted position to the main frame 2. The shank of said screw 16 passes through an elongated slot of the platform 1, so that the platform 1 can be shifted relative to frame 2.

Fig. 2 shows the driving shaft 20 of the electric motor. Said shaft 20 is continuously rotated. The friction disk 21 has its hub releasably fixed to the motor shaft 20, by means of one or more clamping screws 22. Hence, the friction disk 21 is continuously rotated in unison with the driving shaft 20. The friction disk 23 has a hub which is releasably fixed to the driven shaft 24, by one or more clamping screws 25. A pulley 26 has its hub releasably fixed to driven shaft 24, by one or more clamping screws 27. Said pulley 26 may be larger or smaller than the friction disk 23. The driving belt (not shown) is mounted only on pulley 26.

The driven shaft 24 is provided at one end thereof with the usual headed insert 28, for receiving the thrust of the shift arm 29. The shift lever 30, which may be foot-operated or hand-operated, has a head 31, which passes through a bore of the shift arm 29. As shown in Fig. 4, said shift lever 30 has an upwardly extending forked extension 32 which is provided with tapped bores in which pivot screws 33 are respectively located. These pivot screws 33 have conical ends which fit turnably in conical recesses of the head 34 of arm 35, which is suitably supported by the main frame 2, as will be later more fully described. A tension spring 36 has one end thereof connected to a lug of the arm 35. The other end of tension spring 36 is connected to shift lever 30. Therefore, the tension spring 36 maintains the friction facing 23a of the friction disk 23, normally spaced from the friction facing of the friction disk or friction wheel 21.

Arm 35 is provided with a bearing 37 for the driven shaft 24. Arm 35 is designated as a bearing-support, since it supports said bearing 37.

The free end of L-shaped arm 6 has head 38, which has a vertical recess. Said recess has respective rounded concave walls. Said rounded walls can be portions of respective cylindrical surfaces, or portions of the same cylindrical surface. Arm 35 has a head 39 of general tapered shape, which has respective convex walls which abut said respective concave walls. A clamping screw 40, whose head abuts the usual rigid washer 41, rigidly clamps said head 39 to said head 38 of the L-shaped arm 6. As shown in Fig. 3, the shank of said screw 40 extends through a vertical slot of head 39, so that arm 35 can be clamped in adjusted vertical position.

The motor-supporting platform 1 can be adjusted much more easily than according to current practice, to produce absolute alignment of shafts 24 and 20. This is an important feature of our invention, because it eliminates the use of shims and tedious adjustment.

In many cases, it is desirable to interchange the pulley 26 with another pulley, and it is highly desirable that such interchange can be made without disturbing the absolute alignment between the driven shaft 24 and the driving shaft 20 of the electric motor.

This can be easily done according to our invention. The shift arm 29 is turnable upon the cylindrical head 31 of the shift lever 30. The shift arm 29 can thus be turned on the head 31, in a plane which is perpendicular to the plane of the paper in Fig. 2. Suitable screws or other conventional connecting means (not shown) are provided for releasably locking the shift arm 29 in its operative position which is shown in Fig. 2, to the head 31. When such screws or other connecting means are released, the shift arm 29 can be turned around the longitudinal axis of head 31, so as to clear the driven shaft 24. The clamping screws 27 and 25 can then be loosened, so that the driven shaft 24 can be withdrawn longitudinally from its bearing 37, while the pulley 26 and friction disk 23 are slipped off said driven shaft 24. Another pulley can then be substituted for the pulley 26, and the interchanged pulley and the driven shaft 24 and the friction disk 23 can readily be again assembled by sliding the driven shaft 24 longitudinally through its bearing 37, through the hub of the interchanged pulley and through the hub of the friction disk 23.

The clamping screws 27 and 25 can then be tightened.

The shift lever 30 is provided with the usual brake facing 42, which engages a brake groove in the periphery of the friction disk 23, when the shift lever 30 is moved into its unclutching position by means of the tension spring 36.

The L-shaped arm 6 makes it possible for the transmission to clear certain parts which would obstruct a conventional transmission. For example, it is necessary to provide drip pans at the underside of the table of the driven machine, if it is a sewing machine of the ordinary type, and said L-shaped arm 6 makes it possible for the transmission to clear said drip pans.

Figs. 5 and 6 show in detail the conventional shape of the brake facing 42, whose ends extend through bores 44 of the head 45 of the shift lever 30.

In the embodiment of Figs. 8 and 9, the motor-supporting platform 1 is provided with an integral depending bracket or arm 46, which has an end-thrust washer 47. This thrust washer 47 is of any suitable anti-friction type. It can be made of any suitable porous and compressible material whose pores can be filled with oil. This depending arm 46 and its thrust washer 47 take up the end thrust between the shafts 20 and 24, when the friction drive is operative.

The construction of Fig. 10 is identical with that of Figs. 8 and 9, save that in Fig. 10 an arm 48 is provided, which is not integral with the motor-supporting platform 1. This arm or bracket 48 is fixed to the motor-supporting platform 1 by means of screws 49.

The friction members of the friction clutch are of any conventional design. As shown in Fig. 2, disk 23 has the usual annular friction facing 23a, which frictionally engages disk or wheel 21, when shift lever 30 is turned clockwise from the position shown in Fig. 2. Of course, the brake facing 42 is moved out of operative position when the friction drive is operative.

Lock-washers or lock-nuts or other suitable means can be provided, in order to lock the adjusted parts in their adjusted positions.

In the broadest aspect of our invention, we provide a frame 2 and a motor-supporting member 1 which is tiltably adjustable relative to the frame 2, in all directions. A motor-driven driving shaft 20 is, in effect, rotatably connected to said member 1, since the motor (not shown) which drives said motor-driven shaft 20 is fixed to said motor-supporting member 1. The motor-bearing for shaft 20 is thus fixed to member 1.

Said frame 2 and said motor-supporting member 1 have contacting and interfitting universal joint-means, namely, the heads 7 and 9 and their abutting surfaces. However, the scope of the invention is not limited to this type of universal joint-means.

It will be noted that the face of the shift arm 29 which abuts the head of the insert 28 is tapered, and said head of said insert 28 is suitably rounded, in order to provide a cam action between these parts.

We locate the universal joint-means 7, 9, vertically superposed relative to friction disks 23 and 21, in order to facilitate proper adjustment of shafts 24 and 20, in order to align said shafts.

The vertical axis of said universal joint-means 7, 9, namely, the vertical longitudinal axis of bolt 10, is preferably coincident with the median vertical plane between the friction facings of the friction disks 23 and 23a, when said disks 23 and 23a are in the spaced and inoperative position which is shown in Fig. 2.

The adjustable spacing screws 18 and 19 are merely examples of adjusting abutment devices, so that the scope of the invention is not limited to the use of such screws per se. Likewise, the scope of the invention is not limited to adjustably fixing the platform 1 to the frame 2.

As shown in Fig. 1, the abutment members 18 and 19 are located laterally on respective opposite sides of a line between the clamping means 10—14, and the fixing means 16.

Said line is designated as a longitudinal line. As also shown in Fig. 1, the angular arm 6 of frame 2 has a leg which is lateral to said longitudinal line, and said arm 6 also has a longitudinal leg at the free outer end of said arm 6. The angular arm 35 has a leg which extends laterally from its connection to arm 6, in a direction towards said longitudinal line. The driving motor-shaft 20 and the driven shaft 24 are located directly underneath said longitudinal line, and the axes of said shafts 20 and 24 are in substantially the same vertical plane as said longitudinal line.

We claim:

1. A friction-drive device which has a motor which has a driving motor shaft, said device also having a driven shaft, said device also having a frame, a motor-supporting platform located below said frame, said platform being operative to support said motor below said platform, said frame and said platform having abutting walls, said walls being shaped to provide a universal joint so that said platform is movable in all directions relative to said frame while said walls are in abutting relation, said frame and said platform having clamping means at said point to clamp said walls directly to each other in fixed adjusted relation, said device having additional fixing means which are located at a point spaced from said joint, said fixing means being operative to fix said platform to said frame, said frame having abutment members adjustably fixed thereto, said abutment members extending upwardly from said platform and being located to abut the underside of said frame when said platform is fixed to said frame, said abutment members being located laterally relative to a line between said clamping means and said fixing means, said line being located intermediate said abutment members, a bearing connected to said frame, said driven shaft being mounted turnably in said bearing, said shafts being located substantially directly below said line and being substantially alined with said line.

2. A friction-drive device which has a motor which has a driving motor shaft, said device also having a driven shaft, said device also having a frame, a motor-supporting platform located below said frame, said platform being operative to support said motor below said platform, said frame and said platform having abutting walls, said walls being shaped to provide a universal joint so that said platform is movable in all directions relative to said frame while said walls are in abutting relation, said frame and said platform having clamping means at said joint to clamp said walls directly to each other in fixed adjusted relation, said device having additional fixing means which are located at a point spaced from said joint, said fixing means being operative to fix said platform to said frame, said frame having abutment members adjustably fixed thereto, said abutment members extending upwardly from said platform and being located to abut the underside of said frame when said platform is fixed to said frame, said abutment members being located laterally relative to a line between said clamping means and said fixing means, said line being located intermediate said abutment members, a bearing connected to said frame, said driven shaft being mounted turnably in said bearing, said shafts being located substantially directly below said line and being substantially alined with said line, said bearing being connected to said frame by an angular arm which has a transverse leg which is lateral relative to said line and an upstanding leg which extends upwardly from said transverse leg, said upstanding leg being fixed to a transverse supporting arm which is fixed to said frame, said angular arm and said supporting arm being wholly spaced laterally from the space below said platform.

3. A friction-drive device which comprises a frame which supports a motor which has a motor-shaft below said frame, a bearing connected to said frame, a driven shaft turnably mounted in said bearing, said driven shaft being also longitudinally slidable in said bearing, a pulley releasably fixed to said driven shaft externally to said bearing, a driven friction disc also releasably fixed to said driven shaft externally to said bearing, said pulley being located intermediate one end of said bearing and said driven friction disc, said driven shaft being substantially alined in said bearing with said motor-shaft, said motor shaft having a driving friction disc fixed thereto adjacent said driven friction disc, shift means operative to slide said driven shaft to-and-fro in said bearing to contact said friction discs and to separate said friction discs, said driven shaft being longitudinally slidable out of said bearing in a direction away from said motor shaft when said pulley and said driven friction disc are respectively released from said driven shaft, said shift means comprising a shift arm and an actuating member for said shift arm, said shift arm being movably connected to said actuating member so that said shift arm can be fixed in operative position relative to said actuating member and said shift arm can be moved to an inoperative position relative to said actuating member in which said shift arm clears said bearing, whereby said driven shaft can be moved out of said bearing without moving said bearing relative to said motor shaft when it is desired to replace said pulley.

MAX INGWER.
WERNER W. SCHWARZ.